United States Patent Office 2,746,903
Patented May 22, 1956

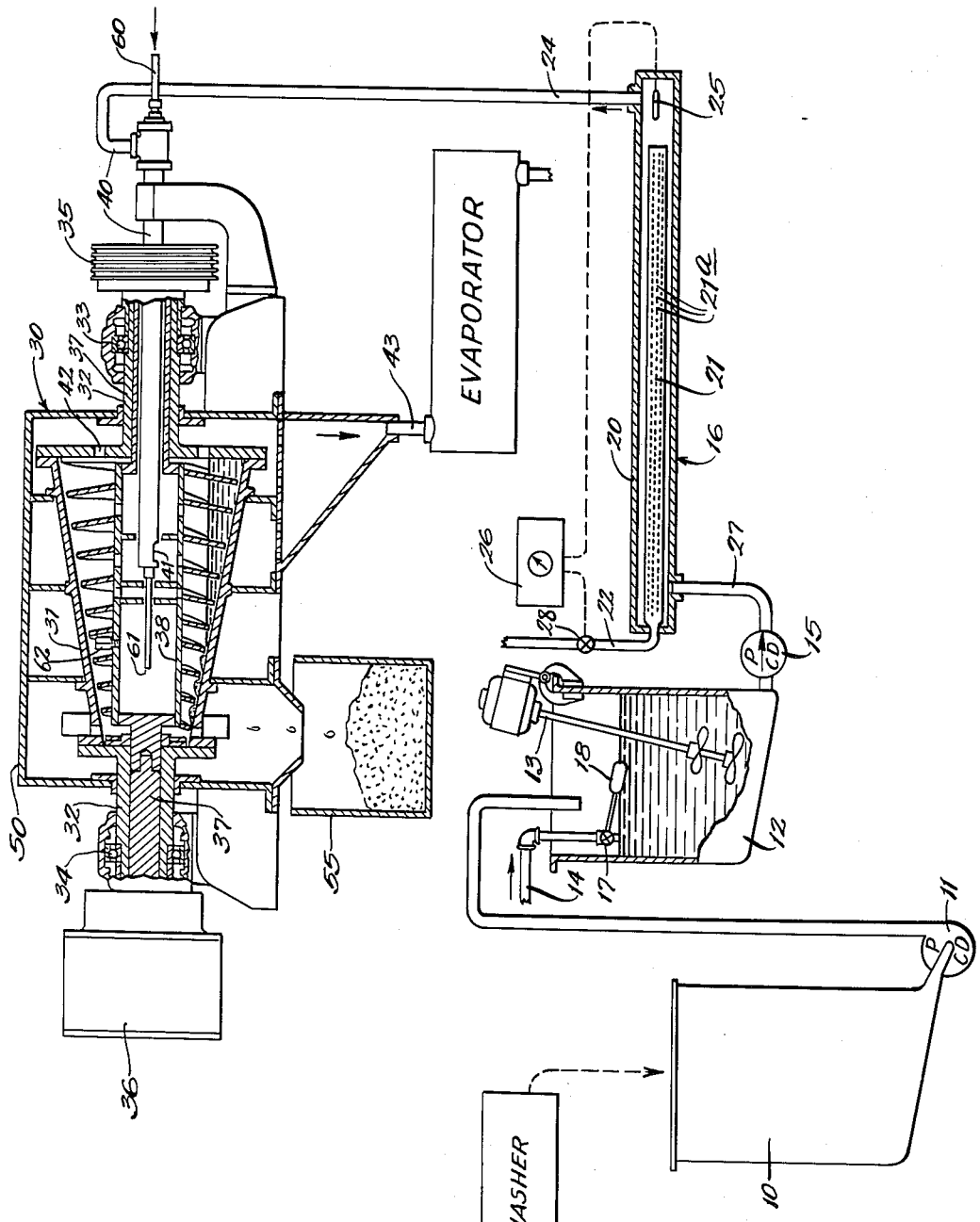

2,746,903

PREPARATION OF LIVER ANTI-ANEMIA FACTOR

Robert H. Sifferd, Clarendon Hills, and Lindson P. Anderson, Chicago, Ill., assignors to Armour and Company, Chicago, Ill., a corporation of Illinois Application August 22, 1952, Serial No. 305,775

11 Claims. (Cl. 167—74.6)

This invention relates to treatment of liver to prepare extracts and other products which are valuable as pharmaceuticals or as foods.

When preparing liver extract the practice has been to hash animal livers, add about three volumes of water and heat the aqueous mixture in kettles or vats of about 400- or 500-gallon capacity until the temperature of coagulation is reached. Heating is continued at a temperature of about 80° C. for 30 minutes or more until coagulation is completed. When the proteins have coagulated the mixture is left to cool and settle, and in the course of a few hours the coagulated proteins will have settled in a bottom layer which can be separated from the aqueous extract. The aqueous extract is then concentrated and distributed in the pharmaceutical trade for therapeutic purposes. It contains certain vitamins and anti-anemia factors. By this procedure a commercial extract is produced in a yield usually of about three or four percent of the original livers used, this percentage being based upon the fresh weight of the livers and the solids content of the extract.

We set about to discover a different process by which a quality product could be prepared in good yields and at a lower processing cost. We have now found that it is possible to prepare an improved liver product in good yields using a new procedure which is very easy to operate and requires a minimum of equipment.

In carrying out our improved procedure, the mammalian livers, from any suitable source, such as, from beef, hog, or sheep, may be hashed and mixed with water to form a slurry which will flow. This slurry is passed in a continuous manner through a heating zone which suitably may be a small tubular heater in which steam is injected into the liver material. While passing through this zone, the material is heated to 185° C., or above, this being the temperature of coagulation of proteins in liver. From the heater, the material which then includes coagulated proteins may be conducted directly to a separator, such as a continuously operating centrifuge wherein the solids, including the coagulated proteins, are separated from the extract.

The figure contained in the accompanying drawing is a schematic representation of apparatus which may be used in the practice of the invention. Referring to this figure, the livers are first hashed as in the usual batch operation. The hashed livers are then held in the feed tank 10 and from this tank the liver material is fed continuously by pump 11 into a mixing tank 12 which is equipped with the agitator 13. Water is introduced through line 14 into the mixing tank 12. The aqueous mixture from tank 12 is conducted by means of pump 15 to the heater 16.

A valve 17 controlled by float 18 maintains the liquid level in tank 12 at a desired constant level, and pump 11, which introduces the liver material, is regulated with respect to the pump 15 so as to deliver material in a predetermined proportion to the aqueous material carried from the mixing step by pump 15. In this way a desired proportion of water is mixed into the hashed liver. We find it desirable to use at least two volumes of water to one of liver.

The heater 16 includes a tubular casing 20. At the center of this casing is a perforated tube 21 which has perforated walls. One end of the tube 21 is closed, and the other end is secured at the end of casing 20 and communicates with the steam line 22. It is desirable that the space between the perforated tube 21 and the walls of the casing 16 be not too great, and we have found that good results are obtained when this space is of the order of ½ inch or less than ¾ inch measured radially from the axial center of the tube.

A material inlet line 27 leads from pump 15 to casing 20 at a point near one end, and a line 24 leads from an opposite end of the casing to the centrifuge. A thermometer or other temperature sensitive device 25 is mounted in the outlet end of the casing, and in the illustrated embodiment this device is connected with an automatic control device 26 which is arranged to control the valve 28 in steam line 22 in accordance with the temperature registered on the temperature sensitive device. In this manner the volume of steam passed to the heater is controlled so as to maintain the outlet temperature at a desired point. The specific construction of such a control device is not illustrated or described since many devices for controlling valve operation in accordance with temperature are well-known. If desired, the automatic control may be omitted and the valve 28 operated by hand. Such hand operation is very effective when the rates of flow delivered by pumps 11 and 15 are left constant.

The centrifuge 30 illustrated in the drawing employs a frustro conical shell structure 31. This shell structure is mounted for rotation at its ends in the bearings 33 and 34. At the larger end of the frustro conical portion of structure 30 there are openings 42 through which liquid from this shell may be discharged.

Within shell structure 31 is a cylindrical member 38 equipped with spiral baffles on its exterior and having openings in the front portion of its wall through which the liquid and smaller solids may pass from the interior through the space between this member and shell structure 31. This member 38 has its end structures 37 rotatably mounted within the ends 32 of the shell structure.

The shell structure 31 is driven by the pulley means 35 and is connected in drive relation through the gear mechanism 36 with the member 38, so that there is a desired relative speed between the rotational movement of the members 31 and 38. The member 38 is driven at a slightly lower rate of speed than is the member 31, so that the spiral baffles may operate as a screw to pass solid materials toward the smaller end of the frustro conical portion of member 31. A stationary casing 50 is disposed about the rotating elements for safety and other protective purposes.

The feed inlet conduit 40 extends axially into the member 38 and discharges at its opening 41. A water inlet line 60 extends through the center of pipe 40 and discharges at its end 61. Water discharged from this line passes out through nozzles 62 to the small portion of the rotating drum to wash the solids being passed along toward the small end of the drum by the spiral baffles.

When the liver material to be treated is introduced through pipe 40 and discharged on the interior of member 38, the liquid together with all but the very large solid particles, is passed through the openings in the cylindrical portion of member 38 and is rotated on the inner surface of the structure 31. The solids thus rotated being heavier than the liquids, are thrown to the surface of the shell and are carried toward the smaller end of the shell by the spiral baffles, thus to be eventually carried beyond the liquid level and discharged from the shell into the container 55. The liquid, from which the solids have been separated, passes through openings 42 and is carried by pipe 43 to the evaporator.

The centrifuge just described is one specific type which may be used in making the separation of solids in our improved process.

Using the apparatus illustrated, the fresh mammalian livers are hashed in the usual way and the hashed liver discharged into tank 10. The pump 11 draws hashed liver from tank 10 and passes it in a continuous manner at a predetermined rate of flow. In the mixing tank it is thoroughly mixed with the water which flows automatically into this tank to maintain a constant level. Pump 15 withdraws the aqueous mixture at a rate which is in a predetermined proportion to the rate of input through pump 11. Suitably the discharge by pump 15 is three or four times the rate of input by pump 11.

The aqueous mixture is passed by pump 15 and line 27 into one end of heater casing 16. At this point the proteins contained in the liver material are in their natural or uncoagulated state. As the material passes along casing 20 it is mixed with steam issuing from the perforations 21a in the walls of the inner tube 21. The steam issues forth from these perforations in the form of jets and as the material passes lengthwise of the casing 20 crosswise of the jets there is a mechanical action which serves to retain and roll the liver mass to provide thorough, rapid distribution of the steam so that upon condensation of the steam its latent heat of vaporization is available at all portions of the mass. In this way a relatively large amount of heat is applied to the relatively small quantity of material passing through the heater casing so that the material is heated quickly to coagulation temperature and then can be passed on immediately.

The control valve 28 is set so as to allow steam to be introduced in the amount required to produce at the outlet of the heater a temperature just above the coagulation point.

The heated material contains solid matter in admixture with liquid and this is passed immediately to the centrifuge where as the material passes continuously therethrough the solid matter consisting chiefly of coagulated proteins is discharged from one end of the centrifuge while the liquid extract is discharged at the other.

Preferably the centrifuge is located at an elevation above the heater so that the material within the heater is maintained at a pressure above atmospheric.

The liquid discharged from the centrifuge may be passed through a vacuum concentrator of the continuously operating type to remove a large portion of the moisture, resulting in a product which may be a rather thick liquid. If a powdered product is desired, this liquid may be vacuum dried in pans or spray dried.

We have found that liver protein molecules, such as are being treated in the present invention, have the unique property of shrinking when heated and of reaching a point of maximum shrinkage at temperatures in the neighborhood of 185° to 200° C. This is an important consideration in extracting the anti-anemia factor from liver material with hot water, for, when the liver protein particles are in heated condition, they have shrunk to a minimum size and thus, very much like a sponge which has been squeezed, they have expelled a maximum amount of water and anti-anemia factor. In the continuous process of the present invention, where the slurry is passed in heated condition directly from the heater to the centrifuge, the separation of liver material from the water takes place while the material is still hot and the protein molecules still at the point of maximum shrinkage, so that a maximum amount of anti-anemia factor is obtained in the water phase. We thus are enabled to achieve substantially increased yields over those obtained in the prior art batch methods wherein the mass is allowed to cool down before separation which in turn allows the liver protein particles to expand and re-absorb considerable amounts of the anti-anemia factor, the re-absorbed amounts being retained in the liver residue and thus discarded. We have found that by our process an average yield of 5½% or more can be commercially obtained, this percentage being based on the solid content of the extract as compared with the weight of the livers.

It is therefore an important feature of our invention that the slurry be separated into its solid and liquid components while the liver protein molecules are at their point of maximum shrinkage. In the embodiment illustrated in the drawing and the foregoing description, this is achieved by passing the slurry directly from the heater to the centrifuge and effecting the separation while the material is still in heated condition.

The timing of the several steps in the process is of substantial importance. For example, when using two-and-one-half parts of water to one of liver in the mixture and adding another one-half part of water at the centrifuge as a wash, we may pump the aqueous mixture through the heating zone at a rate of ten gallons per minute. At this rate the material may be in the heating zone less than two seconds, using a heater of one-third gallon volumetric capacity, may move from the heating zone to the centrifuge in less than ten seconds, and the extract may be separated from the solids in the centrifuge in less than two minutes. The timing will of course vary somewhat with different equipment design. With the equipment we have used, we prefer to employ a heating period of not longer than one minute. In this way, the process is subjected to heat during only a small fraction of the time previously required, and we deem this an important advantage in dealing with heat labile substances such as we desire to obtain from liver. However, the heating period may be extended somewhat beyond a minute, with an accompanying sacrifice in quality of the end product but with no appreciable decrease in yield, provided the separation step follows immediately after the heating step in order to achieve separation at the point of maximum shrinkage of the protein molecules.

This application is a continuation-in-part of our co-pending application Serial No. 681,690, filed July 6, 1946, now abandoned.

In the foregoing detailed explanation we have described a specific procedure carried out using the equipment illustrated. It is contemplated that the process may be carried out in many different procedures by using equipment of much different design. It is understood that the foregoing has been given for purposes of explanation only and no unnecessary limitations should be understood therefrom.

What we claim and desire to secure in Letters Patent is:

1. A process for preparing a liver product comprising mixing one volume of a mammalian liver material with at least 2 volumes of water continuously passing the aqueous liver material in a confined stream through a heating zone, injecting steam into said material as it passes through said zone, condensing said steam while in contact with said material whereby said material is heated to the temperature of coagulation of said proteins contained therein, continuously passing the resulting mixture through a separation zone, separating coagulated proteins from aqueous extract in said separation zone while said proteins are at their point of maximum shrinkage, and evaporating moisture from the aqueous extract to leave a fraction containing the anti-anemia factor.

2. A process for preparing a liver product comprising mixing one volume of a mammalian liver material with at least 2 volumes of water continuously passing the aqueous liver material in a confined stream through a heating zone, heating said material as it passes through said zone to the temperature of coagulation of proteins in said material, continuously passing the resulting aqueous mixture, including the coagulated proteins, continuously through a separation zone, separating coagulated proteins from aqueous extract in said separation zone while said proteins are at their point of maximum shrinkage, and evaporating moisture from the aqueous extract to leave a fraction containing the anti-anemia factor.

3. A process for preparing a liver product comprising mixing one volume of a mammalian liver material with at least 2 volumes of water, heating the aqueous liver material to the temperature of coagulation of proteins contained therein, the heating period being less than one minute, separating coagulated proteins from aqueous extract contained in the resulting mixture, and evaporating moisture from the aqueous extract to leave a fraction containing the anti-anemia factor.

4. A process for preparing a liver product comprising heating a mixture comprising one volume of a mammalian liver material and at least 2 volumes of water, to the temperature of coagulation of proteins contained therein, the heating period being less than two seconds, separating coagulated proteins from aqueous extract contained in the resulting mixture, and evaporating moisture from the aqueous extract to leave a fraction containing the anti-anemia factor.

5. A process for preparing a liver product comprising hashing mammalian livers, mixing at least 2 volumes of water with each volume of the hashed livers, passing the liver mixture continuously through a heating zone, heating the liver mixture in said zone to the temperature of coagulation of proteins in said mixture, passing the heated material from the heating zone continuously through a separation zone to separate the solid from the liquid portions while said material is at the point of maximum protein shrinkage, and evaporating moisture from the aqueous extract to leave a fraction containing the anti-anemia factor.

6. A process as called for in claim 4, wherein the liquid portion issuing from the separation zone is passed continuously through a concentration zone, and removing a substantial amount of the moisture from the material within the concentration zone.

7. In a process for preparing a liver product, the steps of introducing liver material into a mixing zone, introducing water into said mixing zone, withdrawing aqueous liver material from said zone, maintaining a constant volume of aqueous liver material in said zone, controlling the rate of introduction of liver material into said zone and the rate of withdrawal of aqueous liver material whereby there are at least two volumes of water for each volume of liver material in the withdrawn aqueous liver material, passing the withdrawn material in a restricted stream while quickly heating the material to coagulation temperature, subjecting the aqueous coagulated material to centrifugal separation while said material is at the point of maximum protein shrinkage to recover an aqueous phase and a solid phase.

8. In a process for preparing a liver product, the steps of introducing liver material into a mixing zone, introducing water into said mixing zone, withdrawing aqueous liver material from said zone, maintaining a constant volume of aqueous liver material in said zone, controlling the rate of introduction of liver material into said zone and the rate of withdrawal of aqueous liver material whereby there are at least two volumes of water for each volume of liver material in the withdrawn aqueous liver material, passing the withdrawn material in a restricted stream through a heating zone while injecting steam into said stream to heat said material to coagulation temperature at least by the time it reaches the end of said zone, and subjecting the aqueous coagulated material to centrifugal separation while said material is at the point of maximum protein shrinkage to recover an aqueous phase and a solid phase.

9. In a process for preparing a liver product, the steps of introducing liver material into a mixing zone, introducing water into said mixing zone, withdrawing aqueous liver material from said zone, maintaining a constant volume of aqueous liver material in said zone, controlling the rate of introduction of liver material into said zone and the rate of withdrawal of aqueous liver material whereby there are at least two volumes of water for each volume of liver material in the withdrawn aqueous liver material, maintaining a substantial constant temperature at said end of the heating zone by controlling the rate by which the heat is injected into said zone, withdrawing aqueous material containing coagulated proteins from said end of the heating zone, and subjecting the withdrawn material to centrifugal separation while said material is at the point of maximum protein shrinkage to recover an aqueous phase and a solid phase.

10. A process as set forth in claim 1, wherein said material containing coagulated proteins is passed upwardly from said heating zone to said separation zone, whereby the material in said heating zone is maintained under pressure greater than atmospheric pressure.

11. A process as in claim 1, wherein said material in said heating zone is maintained under pressure greater than atmospheric pressure.

References Cited in the file of this patent

UNITED STATES PATENTS

| | | |
|---|---|---|
| 1,742,666 | Owe | Jan. 7, 1930 |
| 1,840,715 | Hiller | Jan. 12, 1932 |
| 2,078,404 | Nielsen | Apr. 7, 1937 |
| 2,125,844 | Keil | Aug. 2, 1938 |
| 2,358,869 | Maurer | Sept. 26, 1944 |

FOREIGN PATENTS

| | | |
|---|---|---|
| 292,327 | Great Britain | June 22, 1928 |
| 332,241 | Great Britain | July 16, 1930 |